United States Patent
Shin et al.

(10) Patent No.: US 8,811,260 B2
(45) Date of Patent: Aug. 19, 2014

(54) COMMUNICATION DEVICE AND RELAY DEVICE

(75) Inventors: Won-Jae Shin, Yongin-si (KR); Tae-Won Yune, Pohang-si (KR); Gi Hong Im, Pohang-si (KR); Chang Yong Shin, Seoul (KR); Dongsik Kim, Gunwi-gun (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 878 days.

(21) Appl. No.: 12/614,503

(22) Filed: Nov. 9, 2009

(65) Prior Publication Data

US 2010/0261426 A1 Oct. 14, 2010

(30) Foreign Application Priority Data

Apr. 13, 2009 (KR) .................. 10-2009-0031783

(51) Int. Cl.
*H04J 1/10* (2006.01)
*H04J 13/00* (2011.01)
*H04B 1/60* (2006.01)
*H04B 17/02* (2006.01)
*H04W 84/04* (2009.01)

(52) U.S. Cl.
CPC .................................. *H04W 84/047* (2013.01)
USPC .................. 370/315; 370/492; 455/7; 455/9; 455/10

(58) Field of Classification Search
None
See application file for complete search history.

(56) References Cited

U.S. PATENT DOCUMENTS

| | | | |
|---|---|---|---|
| 7,706,365 B2 * | 4/2010 | Effros et al. | 370/389 |
| 7,920,501 B2 * | 4/2011 | Larsson et al. | 370/315 |
| 8,018,893 B2 * | 9/2011 | Sartori et al. | 370/329 |
| 8,155,049 B2 * | 4/2012 | Mow et al. | 370/315 |
| 8,315,556 B2 * | 11/2012 | Yu et al. | 455/13.1 |
| 2003/0104787 A1 * | 6/2003 | Blount et al. | 455/67.3 |
| 2005/0014464 A1 * | 1/2005 | Larsson | 455/11.1 |
| 2007/0201400 A1 * | 8/2007 | Kang et al. | 370/329 |
| 2008/0037623 A1 * | 2/2008 | Abou Rjeily | 375/239 |
| 2008/0108369 A1 * | 5/2008 | Visotsky et al. | 455/455 |
| 2009/0005104 A1 * | 1/2009 | Wang et al. | 455/522 |
| 2009/0116419 A1 * | 5/2009 | Chong et al. | 370/312 |
| 2009/0116422 A1 * | 5/2009 | Chong et al. | 370/315 |
| 2009/0185521 A1 * | 7/2009 | Li et al. | 370/315 |

(Continued)

FOREIGN PATENT DOCUMENTS

| | | | |
|---|---|---|---|
| EP | 2611054 | * | 7/2013 |
| KR | 10 2007 0066958 | | 6/2007 |
| WO | WO 2010003098 A2 | * | 1/2010 |

OTHER PUBLICATIONS

Aggelos Bletsas, Member, IEEE, et al, "A Simple Cooperative Diversity Method Based on Network Path Selection," IEEE Journal on Selected Areas in Communications, vol. 24, No. 3, Mar. 2006, pp. 659-672.*

(Continued)

*Primary Examiner* — Timothy J Weidner
(74) *Attorney, Agent, or Firm* — NSIP Law

(57) ABSTRACT

A communication device that may select a relay node from a plurality of relay nodes, and be used as a signal receiving node through the selected relay node is provided. Additionally, a relay device that may be used as a relay node to receive and broadcast signals is provided.

7 Claims, 6 Drawing Sheets

(56) References Cited

U.S. PATENT DOCUMENTS

| | | | |
|---|---|---|---|
| 2009/0196214 A1* | 8/2009 | Li et al. | 370/315 |
| 2010/0110967 A1* | 5/2010 | Sartori et al. | 370/315 |
| 2010/0166095 A1* | 7/2010 | Lee et al. | 375/267 |
| 2010/0246474 A1* | 9/2010 | Zhang et al. | 370/315 |
| 2010/0278153 A1* | 11/2010 | Horiuchi et al. | 370/335 |
| 2011/0096722 A1* | 4/2011 | Jung | 370/328 |
| 2012/0044858 A1* | 2/2012 | Li et al. | 370/315 |

OTHER PUBLICATIONS

Peters et al. "The Future of WiMAX: Multihop Relaying with IEEE 802.16j", IEEE Communications Magazine, Jan. 2009.*

Kyungjun et al. "Appplication of Network Coding to IEEE 802.16j Mobile Multi-hop Relay (MMR) Network for Throughput Enhancement", Journal of Communications and Networks, 2008.*

Frank R. Kschischang, Senior Member, IEEE, et al, "Factor Graphs and the Sum-Product Algorithm," IEEE Transactions on Information Theory, vol. 47, No. 2, Feb. 2001, pp. 498-519.

\* cited by examiner

COMMUNICATION DEVICE AND RELAY DEVICE

CROSS-REFERENCE TO RELATED APPLICATION(S)

This application claims the benefit under 35 U.S.C. §119(a) of a Korean Patent Application No. 10-2009-0031783, filed Apr. 13, 2009, in the Korean Intellectual Property Office, the entire disclosure of which is incorporated herein by reference for all purposes.

BACKGROUND

1. Field

The following description relates to a communication device that may be used as a receiving node and a relay device that may be used as a relay node in a cooperative communication system.

2. Description of the Related Art

A variety of multimedia services, such as a voice service for example, may be provided in a wireless communication environment. Research to support a high quality and high speed data transmission has also been conducted.

A method of obtaining diversity gain by installing a multi-antenna in a terminal has been provided as part of the research.

However, a multi-antenna may not be installed at sufficient intervals in a small user terminal to obtain diversity gain.

Cooperative diversity, which forms a virtual multi-antenna through cooperation between a user terminal with a single antenna and other user terminals or a repeater, has been provided.

Accordingly, research on a method to better the frequency efficiency in a cooperative communication environment may be desired.

SUMMARY

In one general aspect, a communication device includes a first signal receiving unit configured to receive signals from a plurality of signal transmission nodes; a selection unit configured to select one relay node from a plurality of relay nodes based on channels between the plurality of signal transmission nodes and the plurality of relay nodes, and channels between the plurality of relay nodes and the communication device; a second signal receiving unit configured to receive a network-coded signal from the selected relay node; and a decoding unit configured to perform decoding based on the signals received by the first signal receiving unit and the signal received by the second signal receiving unit, and configured to detect the signals transmitted by the plurality of signal transmission nodes. The network-coded signal may be generated by the selected relay node performing network-coding with respect to the signals received from the plurality of signal transmission nodes.

The selection unit may include a channel information receiving unit configured to receive equivalent channel information from each of the plurality of relay nodes and a channel information estimation unit configured to estimate channel information of the channels between the plurality of relay nodes and the communication device. The equivalent channel information may be estimated when each of the plurality of relay nodes regards the channels between each of the plurality of relay nodes and the plurality of signal transmission nodes as a single channel.

The selection unit may also select the one relay node from the plurality of relay nodes based on the equivalent channel information and the estimated channel information.

Each of the plurality of relay nodes can measure an equivalent Signal to Noise Ration (SNR) of the plurality signal transmission nodes based on a Bit Error Rate (BER), and estimate the equivalent channel information based on the equivalent SNR. The BER may be measured when an exclusive OR (XOR) operation is performed with respect to the signals received from the plurality of signal transmission nodes.

The selected relay node may decode the signals received from the plurality of transmission nodes and perform an XOR operation with respect to the decoded signals to perform network decoding.

The selected relay node may calculate Log Likelihood Ratios (LLRs) with respect to each of the signals received from the plurality of signal transmission nodes, perform an XOR operation with respect to the LLRs, and generate the network-coded signal based on the XORed LLR.

The decoding unit may calculate an LLR of each of the signals received by the first signal receiving unit, and an LLR of the signal received by the second signal receiving unit, and may detect the signals transmitted by the plurality of signal transmission nodes based on the calculated LLR of each of the signals received by the first signal receiving unit, and the calculated LLR of the signal received by the second signal receiving unit.

The decoding unit may adjust the signal received by the second signal receiving unit based on the equivalent channel information, and detect the signals transmitted by the plurality of signal transmission nodes.

In another aspect, a relay device includes a signal receiving unit configured to receive signals from a plurality of signal transmission nodes; a coding unit configured to perform network-coding with respect to the signals received by the signal receiving unit; a timer setting unit configured to set a timer based on channels between the plurality of signal transmission nodes and the relay device, and a channel between the relay device and a signal receiving node; and a broadcasting unit configured to broadcast the network-coded signal when the timer expires. The broadcasting unit may not broadcast the network-coded signal when the network-coded signal is received from another relay device before the timer expires.

The timer setting unit may include a first channel information estimation unit configured to regard the channels between the plurality of signal transmission nodes and the relay device as a single channel, and estimate equivalent channel information about the regarded single channel; and a second channel information estimation unit configured to estimate channel information about the channel between the relay device and the signal receiving node.

The timer setting unit may set the timer based on the equivalent channel information and the channel information about the channel between the relay device and the signal receiving node.

The first channel information estimation unit may measure an equivalent SNR of the plurality of signal transmission nodes based on a BER, and estimate the equivalent channel information based on the equivalent SNR. The BER may be measured when an exclusive XOR operation is performed with respect to the signals received by the signal receiving unit.

The coding unit may decode the signals received by the signal receiving unit, and perform an XOR operation with respect to the decoded signals to perform network-decoding.

The coding unit may calculate LLRs with respect to each of the signals, received by the signal receiving unit, performs an XOR operation with respect to the LLRs, and generates the network-coded signal based on the XORed LLR.

The signal receiving node may receive the signals transmitted by the plurality of signal transmission nodes, receive the network-coded signal from the relay device, perform decoding based on the signals received from the plurality of signal transmission nodes and the signal received from the relay device, and detect the signals transmitted by the plurality of signal transmission nodes.

The signal receiving node may calculate an LLR of each of the signals received from the plurality of signal transmission nodes and an LLR of the signal received from the relay device, and detect the signals transmitted by the plurality of signal transmission nodes based on the calculated LLR of each of the signals received from the plurality of signal transmission nodes and the calculated LLR of the signal received from the relay device.

The signal receiving node may adjust the signal received from the relay device based on the equivalent channel information and detect the signals transmitted by the plurality of signal transmission nodes. Other features and aspects will be apparent from the following detailed description, the drawings, and the claims.

Figure 1:
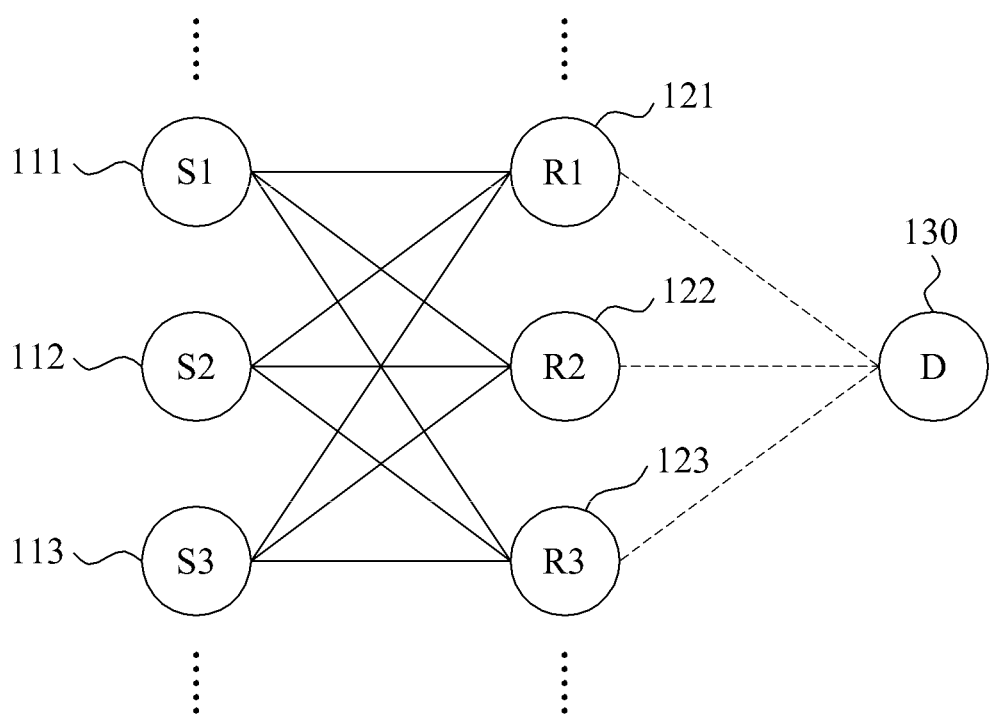
FIG. 1 is a conceptual diagram illustrating an exemplary communication system using a fixed relay node.

Throughout the drawings and the detailed description, unless otherwise described, the same drawing reference numerals will be understood to refer to the same elements, features, and structures. The relative size and depiction of these elements may be exaggerated for clarity, illustration and convenience.

DETAILED DESCRIPTION

The following detailed description is provided to assist the reader in gaining a comprehensive understanding of the media, apparatuses, methods and/or systems described herein. Accordingly, various changes, modifications, and equivalents of the systems, methods, apparatuses and/or media described herein will be suggested to those of ordinary skill in the art. Also, descriptions of well-known functions and constructions may be omitted for increased clarity and conciseness.

FIG. 1 illustrates an exemplary communication system using a fixed relay node which includes a plurality of signal transmission nodes 111, 112, and 113, a plurality of relay nodes 121, 122, and 123, and a signal receiving node 130.

Resources such as a frequency, a code resource, time, space, and the like may be assigned to the plurality of signal transmission nodes 111, 112, and 113, and the plurality of signal transmission nodes 111, 112, and 113 may broadcast signals to the signal receiving node 130. In this case, the resources may be divided for each of the plurality of signal transmission nodes 111, 112, and 113.

A relay node may be selected from the plurality of relay nodes 121, 122, and 123 based on a channel state between the plurality of relay nodes 121, 122, and 123 and the plurality of signal transmission nodes 111, 112, and 113, and a channel state between the signal receiving node 130 and the plurality of relay nodes 121, 122, and 123.

Also, the selected relay node and the signal receiving node 130 may receive the signals transmitted by the plurality of signal transmission nodes 111, 112, and 113.

In this case, for example, the selected relay node may perform network-coding with respect to the signals, received from the plurality of signal transmission nodes 111, 112, and 113, and transmit the network-coded signal to the signal receiving node 130.

The signal receiving node 130 may receive the network-coded signal from the selected relay node, perform decoding based on the signal received from the selected relay node and the signals received from the plurality of signal transmission nodes 111, 112, and 113, and may thereby detect the signals transmitted by the plurality of signal transmission nodes 111, 112, and 113.

A concept of an exemplary embodiment has been schematically described. The exemplary embodiment may be classified into a centralized communication system and a distributed communication system depending on a subject to select the relay node from the plurality of relay nodes 121, 122, and 123.

Hereinafter, an exemplary embodiment of the centralized communication system and an exemplary embodiment of the distributed communication system are further described.

<Centralized Communication System>

The centralized exemplary embodiment relates to a method where the signal receiving node 130 selects one relay node from the plurality of relay nodes 121, 122, and 123.

The plurality of signal transmission nodes 111, 112, and 113 may broadcast signals to the signal receiving node 130.

In this case, for example, the plurality of relay nodes 121, 122, and 123 and the signal receiving node 130 may receive the signals transmitted by the plurality of signal transmission nodes 111, 112, and 113.

Here, when it is assumed that a number of signal transmission nodes 111, 112, and 113 is $N_S$, and a number of relay nodes 121, 122, and 123 is $N_R$, the signals received by the plurality of relay nodes 121, 122, and 123 may be represented as, $$y_{ij}=h_{ij}x_i+n, i=1,2,\ldots,N_S, j=1,2,\ldots,N_R \quad \text{[Equation 1]}$$

where $y_{ij}$ may denote a signal received by a $j^{th}$ relay node when an $i^{th}$ signal transmission node of the plurality of signal transmission nodes 111, 112, and 113 transmits the signal.

Also, $h_{ij}$ may denote a channel between the $j^{th}$ relay node and the $i^{th}$ signal transmission node, and n may denote an Additive White Gaussian Noise (AWGN).

Also, $x_i$ may denote a $2^Q$-Quadrature Amplitude Modulation (QAM) symbol transmitted by the $i^{th}$ signal transmission node.

Also, a signal received by the signal receiving node 130 may be represented as, $$y_{iD}=h_{iD}x_i+n, i=1,2,\ldots,N_S \quad \text{[Equation 2]}$$

where $y_{iD}$ may denote the signal received by the signal receiving node 130 when the $i^{th}$ signal transmission node of the plurality of signal transmission nodes 111, 112, and 113 transmits the signal.

Also, $h_{iD}$ may denote a channel between the signal receiving node 130 and the $i^{th}$ signal transmission node, and n may denote an AWGN.

Also, $x_i$ may denote the $2^Q$-QAM symbol transmitted by the $i^{th}$ signal transmission node.

When the signals are received from the plurality of signal transmission nodes 111, 112, and 113, each of the plurality of relay nodes 121, 122, and 123 may estimate channel information of channels between each of the plurality of relay nodes 121, 122, and 123 and the plurality of signal transmission nodes 111, 112, and 113 based on the received signals.

Also, each of the plurality of relay nodes 121, 122, and 123 may regard the channels between each of the plurality of relay nodes 121, 122, and 123 and the plurality of signal transmission nodes 111, 112, and 113 as a single channel based on the estimated channel information, and estimate equivalent channel information of the regarded channel.

For example, the relay node (R1) 121 may regard a channel $h_{11}$ between the signal transmission node (S1) 111 and the relay node (R1) 121, a channel $h_{21}$ between the signal transmission node (S2) 112 and the relay node (R1) 121, and a channel $h_{31}$ between the signal transmission node (S3) 113 and the relay node (R1) 121 as a single channel, and may estimate the equivalent channel information.

An exemplary operation where each of the plurality of relay nodes 121, 122, and 123 estimates the equivalent channel information is described below.

Each of the plurality of relay nodes 121, 122, and 123 may decode the signals received from the plurality of signal transmission nodes 111, 112, and 113, and perform an exclusive OR (XOR) operation with respect to the decoded signals. Also, each of the plurality of relay nodes 121, 122, and 123 may measure a Bit Error Rate (BER) of the XORed signal, calculate an equivalent Signal to Noise Ratio (SNR) from the measured BER, and thereby may estimate the equivalent channel information.

It may be assumed that the $j^{th}$ relay node receives $y_{1j}$, $y_{2j}$, and $y_{3j}$, and a BER measured by the $j^{th}$ relay node with respect to each of $y_{1j}$, $y_{2j}$, and $y_{3j}$ is $p_{1j}$, $p_{2j}$, and $p_{3j}$, respectively.

When a BER measured when the $j^{th}$ relay node decodes $y_{1j}$ and $y_{2j}$, and performs the XOR operation with respect to the decoded signal is $p_{x_1 \oplus x_2}$, $p_{x_1 \oplus x_2}$ may be represented as, $$p_{x_1 \oplus x_2} = p_{1j}(1-p_{2j}) + p_{2j}(1-p_{1j}) \quad \text{[Equation 3]}$$

Equation 3 may be represented as, $$2p_{x_1 \oplus x_2} - 1 = -(1 - 2p_{1j})(1 - 2p_{2j}) \quad \text{[Equation 4]}$$
$$p_{x_1 \oplus x_2} = \frac{1 - (1 - 2p_{1j})(1 - 2p_{2j})}{2}$$

Here, when considering $y_{3j}$, $p_{x_1 \oplus x_2 \oplus x_3}$ may be represented as, $$p_{x_1 \oplus x_2 \oplus x_3} = p_{x_1 \oplus x_2}(1 - p_{3j}) + p_{3j}(1 - p_{x_1 \oplus x_2}) \quad \text{[Equation 5]}$$
$$2p_{x_1 \oplus x_2 \oplus x_3} - 1 = (1 - 2p_{3j})(2p_{x_1 \oplus x_2} - 1)$$
$$p_{x_1 \oplus x_2 \oplus x_3} = \frac{1 - (1 - 2p_{1j})(1 - 2p_{2j})(1 - 2p_{3j})}{2}$$

When a BER calculation described above is generalized a BER measured when the $j^{th}$ relay node decodes the signals, received from the plurality of signal transmission nodes 111, 112, and 113, and performs the XOR operation with respect to the decoded signals, that is, $$p_{x_1 \oplus x_2 \oplus \ldots \oplus x_{N_S}},$$

may be represented as, $$p_j = p_{x_1 \oplus x_2 \oplus \ldots \oplus x_{N_S}} = \frac{1 - \prod_{i=1}^{N_S}(1 - 2p_{ij})}{2} \quad \text{[Equation 6]}$$

The calculated BER may be represented as a Q-function which is an SNR function. The plurality of relay nodes 121, 122, and 123 may calculate an equivalent SNR when it is regarded that channels between the plurality of signal transmission nodes 111, 112, and 113 and the $j^{th}$ relay node as a single channel, using an inverse Q-function.

When it may be assumed that the plurality of signal transmission nodes 111, 112, and 113 transmits a signal through a Binary Phase-Shift Keying (BPSK) modulation, a BER of a signal $y_{ij}$, received by the $j^{th}$ relay node from the $i^{th}$ signal transmission node, that is, $p_{ij}$, may be represented as, $$p_{ij} = Q(\sqrt{2|h_{ij}|^2 \text{SNR}}), i = 1, 2, \ldots, N_S \quad \text{[Equation 7]}$$

In this case, for example, a BER when the signals received by the $j^{th}$ relay node are XORed, that is, $p_j$, may be measured using Equation 6. The equivalent SNR may be calculated using Equation 6 and the inverse Q-function of Equation 7.

The equivalent SNR may be represented as, $$SNR_j^{EQ} = \frac{(Q^{-1}(p_j))^2}{2} = |h_j^{EQ}|^2 SNR \quad \text{[Equation 8]}$$

The plurality of relay nodes 121, 122, and 123 may measure an equivalent SNR of the $j^{th}$ node, that is, $SNR_j^{EQ}$, from Equation 8. Also, an equivalent channel gain of the $j^{th}$ relay node, that is, $|h_j^{EQ}|$ may be obtained from the equivalent SNR.

Accordingly, each of the plurality of relay nodes 121, 122, and 123 may estimate equivalent channel information between each of the plurality of relay nodes 121, 122, and 123 and the plurality of signal transmission nodes 111, 112, and 113 by decoding the signals received by each of the plurality of relay nodes 121, 122, and 123, performing the XOR operation, and measuring the equivalent SNR using a BER of the XORed signal.

While the plurality of relay nodes 121, 122, and 123 estimates the equivalent channel information, the signal receiving node 130 may estimate channel information of channels between the plurality of signal transmission nodes 111, 112, and 113 and the signal receiving node 130 based on the signals received from the plurality of signal transmission nodes 111, 112, and 113.

When the estimation of the equivalent channel information is completed, each of the plurality of relay nodes 121, 122, and 123 may transmit the equivalent channel information to the signal receiving node 130.

In this case, for example, the signal receiving node 130 may estimate channel information of channels between the plurality of relay nodes 121, 122, and 123 and the signal receiving node 130. Also, the signal receiving node 130 may select a relay node to participate in the cooperative communication from the plurality of relay nodes 121, 122, and 123, based on the estimated channel information and the equivalent channel information received from each of the plurality of relay nodes 121, 122, and 123.

For example, the signal receiving node 130 may select a relay node with a maximum harmonic mean of an equivalent channel gain $|h_j^{EQ}|$ and a channel gain of the channels between the signal receiving node 130 and plurality of relay nodes 121, 122, and 123. The equivalent channel gain $|h_j^{EQ}|$ may be obtained from Equation 8.

Also, the signal receiving node 130 may compare the equivalent channel gain and the channel gain of the channels between the signal receiving node 130 and the plurality of relay nodes 121, 122, and 123 with respect to each of the plurality of relay nodes 121, 122, and 123, and detect a smaller channel gain. Accordingly, the signal receiving node 130 may select a relay node having a maximum detected channel gain from among the plurality of relay nodes 121, 122, and 123.

That is, the signal receiving node 130 may select a relay node having an optimum channel state from the plurality of relay nodes 121, 122, and 123, based on the equivalent channel information and the channel information of the channels between the plurality of relay nodes 121, 122, and 123 and the signal receiving node 130.

When the relay node is selected, the signal receiving node 130 may transmit relay node selection information to the selected relay node.

In this case, for example, when the relay node selection information is received from the signal receiving node 130, the selected relay node may perform network-coding with respect to the signals received from the plurality of signal transmission nodes 111, 112, and 113.

For example, the selected relay node may perform network-coding by decoding the signals received from the plurality of signal transmission nodes 111, 112, and 113, and performing the XOR operation with respect to the decoded signals.

An exemplary operation of the network-decoding with respect to the signals received from the plurality of signal transmission nodes 111, 112, and 113 is described below.

When it is assumed that the $j^{th}$ relay node is selected, the signal $y_{ij}$ received by the $j^{th}$ relay node from the $i^{th}$ signal transmission node may be represented as Equation 1.

A matched filter output $\tilde{x}_{ij}$ of the signal $y_{ij}$ received by the $j^{th}$ relay node may be represented as, $$\tilde{x}_{ij} = \frac{h_{ij}^*}{\sigma_n^2} y_{ij} = \frac{|h_{ij}|^2}{\sigma_n^2} x_i + \frac{h_{ij}^*}{\sigma_n^2} n, \; i=1, 2, \ldots, N_S \quad \text{[Equation 9]}$$

A Log Likelihood Ratio (LLR) of the signal received by the $j^{th}$ relay node from the $i^{th}$ signal transmission node, that is, $L_{ij}(c_{i,m})$, may be represented as, $$L_{ij}(c_{i,m}) = \ln \frac{\sum_{\forall \alpha_q : c_{i,m}=1} \exp\left(-\frac{|\tilde{x}_{ij} - \mu_{ij,q}|^2}{\sigma_{ij}^2}\right)}{\sum_{\forall \alpha_q : c_{i,m}=-1} \exp\left(-\frac{|\tilde{x}_{ij} - \mu_{ij,q}|^2}{\sigma_{ij}^2}\right)}, \quad \text{[Equation 10]}$$

$i = 1, 2, \ldots, N_S$ where $c_i$ may denote an information bit of the $i^{th}$ signal transmission node, and $\forall \alpha_q : c_{i,m}=1$ and $\forall \alpha_q : c_{i,m}=-1$ may denote mutually exclusive subsets of available transmission symbols configured as a symbol having 1 as an $m^{th}$ symbol, and a symbol having $-1$ as an $m^{th}$ symbol, respectively.

In this case, for example, when a mean of $\tilde{x}_{ij}$ is $\mu_{ij,q}$, and a variance of $\tilde{x}_{ij}$ is $\sigma_{ij}^2$, $\mu_{ij,q}$ and $\sigma_{ij}^2$ may be represented as, $$\mu_{ij,q} = E\{\tilde{x}_{ij} \mid x_i = \alpha_q\} = \alpha_q \frac{|h_{ij}|^2}{\sigma_n^2} \quad \text{[Equation 11]}$$

$$\sigma_{ij}^2 = \text{Cov}\{\tilde{x}_{ij}, \tilde{x}_{ij} \mid x_i = \alpha_q\} = \frac{|h_{ij}|^2}{\sigma_n^2}$$

The selected relay node may calculate the LLRs of the signals received from the plurality of signal transmission nodes 111, 112, and 113, as shown in Equation 10.

Subsequently, the selected relay node may perform an XOR operation with respect to the LLRs, and thereby may obtain $L_R(c_{XOR,m})$.

In this case, $L_R(c_{XOR,m})$ where the LLRs are XORed may be represented as, $$L_R(c_{XOR,m}) = 2\tanh^{-1}\left(\prod_{i=1}^{N_S} \tanh \frac{L_{ij}(c_{i,m})}{2}\right) \quad \text{[Equation 12]}$$

The selected relay node may calculate $L_R(c_{XOR,m})$ using Equation 12, perform hard decision with respect to $L_R(c_{XOR,m})$, and thereby may obtain $c_{XOR,m}$.

Subsequently, the selected relay node may modulate $x_{XOR}$ from $c_{XOR,m}$.

That is, the selected relay node may calculate the LLRs with respect to the signals received from the plurality of signal transmission nodes 111, 112, and 113, using Equation 9 through Equation 11, and perform the XOR operation with respect to the LLRs. Also, the selected relay node may obtain the network-coded signal $x_{XOR}$ from the XORed LLR using Equation 12.

When the network-coded signal $x_{XOR}$ is obtained from Equation 12, the selected relay node may transmit the network-coded signal $x_{XOR}$ to the signal receiving node 130.

For example, when the signal received by the signal receiving node 130 from the selected relay node is $y_{XOR}$, $y_{XOR}$ may be represented as $$y_{XOR} = h_{jD} x_{XOR} + n \quad \text{[Equation 13]}$$

The signal receiving node 130 may receive $y_{XOR}$ from the selected relay node, and perform decoding based on $y_{XOR}$ and the signals $y_{iD}$ received from the plurality of signal transmission nodes 111, 112, and 113. Accordingly, the signal receiving node 130 may detect the signals transmitted by the plurality of signal transmission nodes 111, 112, and 113.

In this case, for example, the signal receiving node 130 may calculate the LLRs of the signals $y_{iD}$, received from the plurality of signal transmission nodes 111, 112, and 113, and an LLR of the signal $y_{XOR}$ received from the selected relay node through a matched filtering with respect to $y_{XOR}$ and $y_{iD}$, similarly to an operation described using Equation 10.

When the LLRs of the signals $y_{iD}$, received from the plurality of signal transmission nodes 111, 112, and 113 are $L_{iD}(c_{i,m})$, $i=1, 2, \ldots, N_S$, and the LLR of the signal $y_{XOR}$ received from the selected relay node is $L_{RD}(c_{XOR,m})$, the signal receiving node 130 may detect the signals transmitted by the plurality of signal transmission nodes 111, 112, and 113 by calculating LLRs using $L_{iD}(c_{i,m})$, i=1, 2, ..., $N_S$ and $L_{RD}(c_{XOR,m})$ according to Equation 14 given as below.

$$L_i(c_{i,m}) = L_{iD}(c_{i,m}) + \qquad \text{[Equation 14]}$$

$$2\tanh^{-1}\left(\tanh\frac{L_{RD}(c_{XOR,m})}{2} \cdot \prod_{i'=1,i'\neq i}^{N_S} \tanh\frac{L_{i'D}(c_{i',m})}{2}\right)$$

$$i = 1, 2, \ldots N_S$$

In general, when A and B are XORed, and the XORed result and B are XORed again, A may be a resultant. That is, it is known that "(A xor B) xor B=A".

In $2\tanh^{-1}\left(\tanh\frac{L_{RD}(c_{XOR,m})}{2} \cdot \prod_{i'=1,i'\neq i}^{N_S} \tanh\frac{L_{i'D}(c_{i',m})}{2}\right)$ in Equation 14, it may be ascertained that and $L_{i'D}(c_{i',m})$, i'=1, 2, ..., $N_S$, i'≠i and $L_{RD}(c_{XOR,m})$ are XORed.

That is, it may be ascertained that the LLR of the signal $y_{XOR}$, received from the selected relay node, and LLRs of signals, received from signal transmission nodes excluding the $i^{th}$ signal transmission node from the plurality of signal transmission nodes 111, 112, and 113 are XORed each other.

Accordingly, due to "(A xor B) xor B=A", an XORed result of $L_{i'D}(c_{i',m})$, i'=1, 2, ..., $N_S$, i'≠i and $L_{RD}(c_{XOR,m})$ may be used as the LLR to detect the signal transmitted from the $i^{th}$ signal transmission node.

Thus, the signal receiving node 130 may use a sum of an LLR $L_{iD}(c_{i,m})$ of the signal, transmitted from the $i^{th}$ signal transmission node, and the XORed result of $L_{i'D}(c_{i',m})$, i'=1, 2, ..., $N_S$, i'≠i and $L_{RD}(c_{XOR,m})$ to detect the signal transmitted from the $i^{th}$ signal transmission node.

That is, the signal receiving node 130 may detect the signals transmitted by the plurality of signal transmission nodes 111, 112, and 113, by using $L_{iD}(c_{i,m})$ for decision.

Through this, the signal receiving node 130 may detect the signals transmitted by the plurality of signal transmission nodes 111, 112, and 113 based on a high detection rate, which may enable a high diversity gain to be obtained.

The above-described method of detecting the signals transmitted by the plurality of signal transmission nodes 111, 112, and 113 according to Equation 14 may be referred to as a message passing algorithm based on belief propagation.

When detecting the signals transmitted by the plurality of signal transmission nodes 111, 112, and 113 based on Equation 14, the signal receiving node 130 may take a channel state between the selected relay node and the plurality of signal transmission nodes 111, 112, and 113 into account.

When the channel state between the selected relay node and the plurality of signal transmission nodes 111, 112, and 113 is not appropriate, a reliability of $$2\tanh^{-1}\left(\tanh\frac{L_{RD}(c_{XOR,m})}{2} \cdot \prod_{i'=1,i'\neq i}^{N_S} \tanh\frac{L_{i'D}(c_{i',m})}{2}\right)$$

of Equation 14 may be reduced. Accordingly, an accuracy of detecting the signals transmitted by the plurality of signal transmission nodes 111, 112, and 113 may be reduced.

Thus, the signal receiving node 130 may control an effect of the signal $y_{XOR}$, received from the selected relay node, on the detection of the signals transmitted by the plurality of signal transmission nodes 111, 112, and 113, based on the channel state between the selected relay node and the plurality of signal transmission nodes 111, 112, and 113.

When the selected relay node decodes $x_{XOR}$ using Equation 12, and a decoding error of the selected relay node is taken into account, the signal $y_{XOR}$ received by the signal receiving node 130 from the selected relay node may be represented as, $$y_{XOR} = h_{jD}\hat{x}_{XOR} + n = h_{jD}x_{XOR} + h_{jD}e_j + n \qquad \text{[Equation 15]}$$

where $e_j$ may denote a decoding error of the $j^{th}$ relay node having a mean of '0' (zero mean) and a distribution of $$\frac{1}{|h_j^{EQ}|^2 SNR}.$$

The signal receiving node 130 may apply a predetermined weight to $y_{XOR}$ based on an equivalent channel gain among the selected relay node and the plurality of signal transmission nodes 111, 112, and 113. Accordingly, the signal receiving node 130 may control the effect of the signal $y_{XOR}$ on the detection of the signals transmitted by the plurality of signal transmission nodes 111, 112, and 113 from Equation 14.

In this case, for example, the predetermined weight may be represented as, $$w = \frac{h_{jD}}{|h_{jD}|^2/|h_j^{EQ}|^2 + 1} SNR \qquad \text{[Equation 16]}$$

When $|h_{jD}|^2 < |h_j^{EQ}|^2$, the signal receiving node 130 may determine that a state of an equivalent channel between the selected relay node and the plurality of signal transmission nodes 111, 112, and 113 is appropriate. Accordingly, the predetermined weight may be set to enable the effect of the signal $y_{XOR}$ to be increased when detecting the signals transmitted by the plurality of signal transmission nodes 111, 112, and 113.

Conversely, when $|h_{jD}|^2 > |h_j^{EQ}|^2$, the signal receiving node 130 may determine that the state of the equivalent channel between the selected relay node and the plurality of signal transmission nodes 111, 112, and 113 is not appropriate. Accordingly, the predetermined weight may be set to enable the effect of the signal $y_{XOR}$ to be decreased when detecting the signals transmitted by the plurality of signal transmission nodes 111, 112, and 113.

In this case, for example, a signal where the signal receiving node 130 applies the predetermined weight of Equation 16 to the signal $y_{XOR}$ may be represented as, $$\hat{x}_{XOR} = w * y_{XOR} \qquad \text{[Equation 17]}$$

$$= \frac{|h_{jD}|^2 SNR}{|h_{jD}|^2/|h_j^{EQ}|^2 + 1} x_{XOR} +$$

$$\frac{|h_{jD}|^2 SNR}{|h_{jD}|^2/|h_j^{EQ}|^2 + 1} e_j +$$

$$\frac{h_{jD}^* SNR}{|h_{jD}|^2/|h_j^{EQ}|^2 + 1} n$$

A mean and a distribution of $\tilde{x}_{XOR}$ of Equation 17 may be represented as, $$\mu_{XOR,q} = E\{\tilde{x}_{XOR} \mid x_{XOR} = \alpha_q\} \quad \text{[Equation 18]}$$
$$= \alpha_q \frac{h_{jD}SNR}{|h_{jD}|^2 / |h_j^{EQ}|^2 + 1}$$

$$\sigma_{XOR}^2 = \text{Cov}\{\tilde{x}_{XOR}, \tilde{x}_{XOR} \mid x_{XOR} = \alpha_q\}$$
$$= \frac{h_{jD}SNR}{|h_{jD}|^2 / |h_j^{EQ}|^2 + 1}$$

The signal receiving node 130 may calculate an LLR of $\tilde{x}_{XOR}$ using the mean and the distribution of $\tilde{x}_{XOR}$ obtained from Equation 18. Also, the signal receiving node 130 may detect the signals transmitted by the plurality of signal transmission nodes 111, 112, and 113 by calculating the LLRs of Equation 14 based on the LLR of $\tilde{x}_{XOR}$, and the LLRs $L_{iD}(c_{i,m})$, i=1, 2, ..., $N_S$ of the signals $y_{iD}$ received from the plurality of signal transmission nodes 111, 112, and 113.

Figure 2:
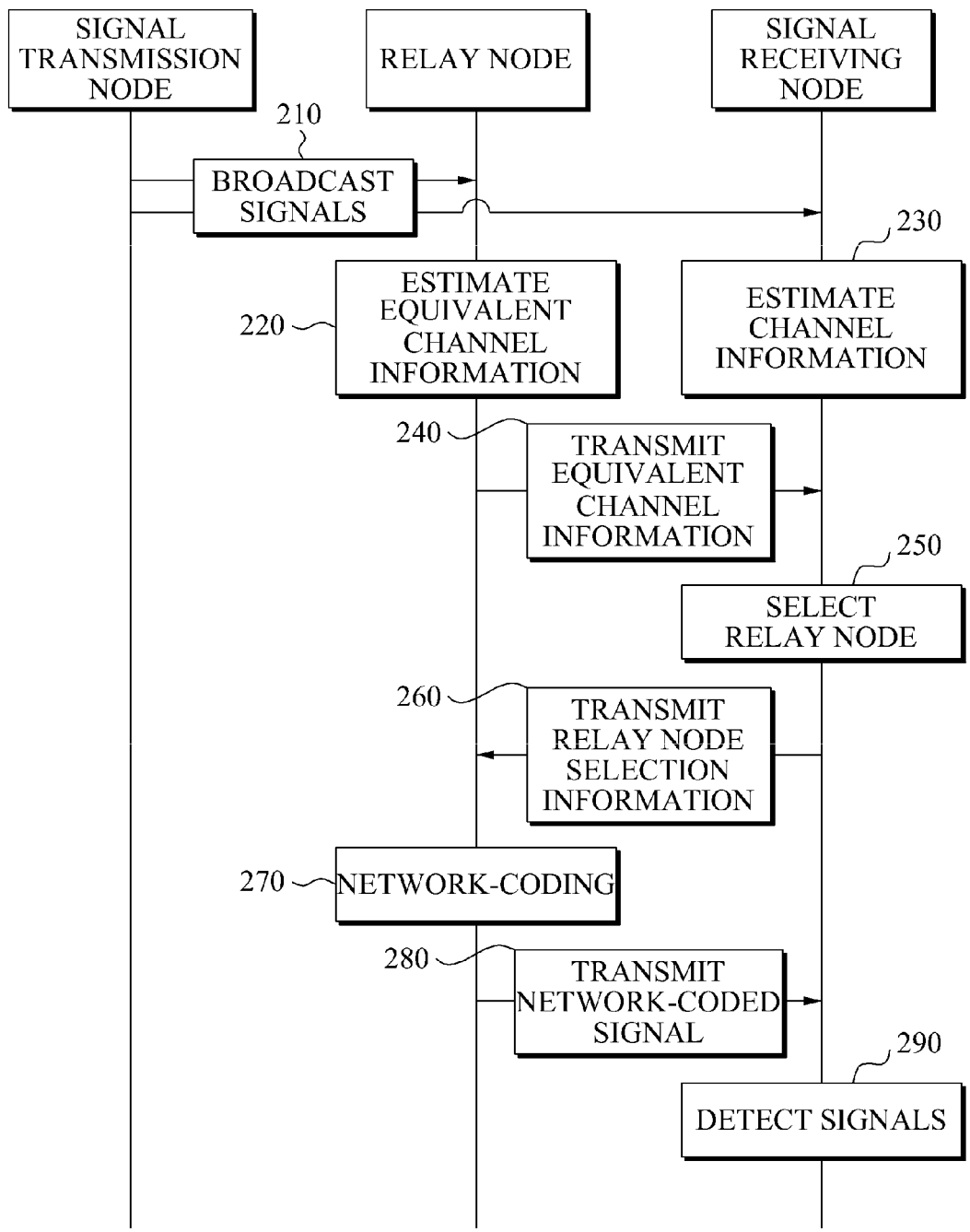
FIG. 2 is a flowchart illustrating a centralized exemplary embodiment.

FIG. 2 is a flowchart illustrating a centralized exemplary embodiment.

In operation 210, the plurality of signal transmission nodes 111, 112, and 113 may broadcast signals to the signal receiving node 130.

In operation 220, the plurality of relay nodes 121, 122, and 123 may estimate channel information of channels between the plurality of relay nodes 121, 122, and 123 and the plurality of signal transmission nodes 111, 112, and 113 based on the signals received from the plurality of signal transmission nodes 111, 112, and 113.

Also, each of the plurality of relay nodes 121, 122, and 123 may regard the channels between each of the plurality of relay nodes 121, 122, and 123 and the plurality of signal transmission nodes 111, 112, and 113 as a single channel based on the estimated channel information, and estimate equivalent channel information of the single channel.

In operation 230, the signal receiving node 130 may estimate channel information of channels between the plurality of signal transmission nodes 111, 112, and 113 and the signal receiving node 130, based on the signals received from the plurality of signal transmission nodes 111, 112, and 113.

In operation 240, the plurality of relay nodes 121, 122, and 123 may transmit the equivalent channel information to the signal receiving node 130.

In operation 250, the signal receiving node 130 may estimate channel information of channels between the plurality of relay nodes 121, 122, and 123 and the signal receiving node 130, and select a relay node to perform a cooperative communication from the plurality of relay nodes 121, 122, and 123 based on the estimated channel information and the equivalent channel information.

In operation 260, the signal receiving node 130 may transmit relay node selection information to the selected relay node.

In operation 270, the selected relay node may perform network-coding with respect to the signals received from the plurality of signal transmission nodes 111, 112, and 113.

In operation 280, the selected relay node may transmit the network-coded signal to the signal receiving node 130.

In operation 290, the signal receiving node 130 may perform decoding based on the signals, received from the plurality of signal transmission nodes 111, 112, and 113, and the signal received from the selected relay node, and thereby may detect the signals transmitted by the plurality of signal transmission nodes 111, 112, and 113.

<Distributed Communication System>

The distributed exemplary embodiment relates to a method where a plurality of relay nodes 121, 122, and 123 directly selects a relay node to participate in a cooperative communication.

That is, the distributed exemplary embodiment may be distinguishable from the centralized exemplary embodiment in terms of a selection scheme. However, overall operations of the distributed exemplary embodiment may be similar to those of the centralized exemplary embodiment.

A plurality of signal transmission nodes 111, 112, and 113 may broadcast signals to a signal receiving node 130.

In this case, for example, the plurality of relay nodes 121, 122, and 123 and a signal receiving node 130 may receive the signals transmitted by the plurality of signal transmission nodes 111, 112, and 113.

Here, when it is assumed that a number of signal transmission nodes 111, 112, and 113 is $N_S$, and a number of relay nodes 121, 122, and 123 is $N_R$, the signals received by the plurality of relay nodes 121, 122, and 123 may be represented by Equation 1.

Also, a signal received by the signal receiving node 130 may be represented by Equation 2.

When the signals are received from the plurality of signal transmission nodes 111, 112, and 113, the plurality of relay nodes 121, 122, and 123 may estimate channel information of channels between each of the plurality of relay nodes 121, 122, and 123 and the plurality of signal transmission nodes 111, 112, and 113 based on the received signals.

While the plurality of relay nodes 121, 122, and 123 estimates the channel information, the signal receiving node 130 may estimate channel information of channels between the plurality of signal transmission nodes 111, 112, and 113 and the signal receiving node 130 based on the signals received from the plurality of signal transmission nodes 111, 112, and 113.

Each of the plurality of relay nodes 121, 122, and 123 may perform network-coding with respect to the signals received from the plurality of signal transmission nodes 111, 112, and 113.

For example, each of the plurality of relay nodes 121, 122, and 123 may perform network-coding by decoding the signals received from the plurality of signal transmission nodes 111, 112, and 113, and performing an XOR operation with respect to the decoded signals.

In this case, for example, each of the plurality of relay nodes 121, 122, and 123 may calculate LLRs with respect to the signals received from the plurality of signal transmission nodes 111, 112, and 113, using Equation 9 through Equation 11, and perform the XOR operation with respect to the LLRs. Also, each of the plurality of relay nodes 121, 122, and 123 may obtain a network-coded signal $x_{XOR}$ from the XORed LLR using Equation 12.

When the network-coding with respect to the signals received from the plurality of signal transmission nodes 111, 112, and 113 is completed, the plurality of relay nodes 121, 122, and 123 may regard the channels between each of the plurality of relay nodes 121, 122, and 123 and the plurality of signal transmission nodes 111, 112, and 113 as a single channel, and estimate equivalent channel information of the single channel.

In this case, for example, each of the plurality of relay nodes 121, 122, and 123 may decode the signals received from the plurality of signal transmission nodes 111, 112, and 113, and perform an XOR operation with respect to the decoded signals. Also, each of the plurality of relay nodes 121, 122, and 123 may measure a BER of the XORed signal, calculate an equivalent SNR from the measured BER, and thereby may estimate the equivalent channel information.

In this case, for example, each of the plurality of relay nodes 121, 122, and 123 may estimate the equivalent channel information using Equation 3 through Equation 8.

When the estimation of the equivalent channel information is completed, each of the plurality of relay nodes 121, 122, and 123 may estimate channel information of channels between the plurality of relay nodes 121, 122, and 123 and the signal receiving node 130.

Subsequently, each of the plurality of relay nodes 121, 122, and 123 may set a timer based on the equivalent channel information and the channel information of the channels between the plurality of relay nodes 121, 122, and 123 and the signal receiving node 130.

In this case, for example, each of the plurality of relay nodes 121, 122, and 123 may calculate a harmonic mean of an equivalent channel gain $|h_j^{EQ}|$ and a channel gain of the channels between the signal receiving node 130 and the plurality of relay nodes 121, 122, and 123. The equivalent channel gain $|h_j^{EQ}|$ may be obtained from Equation 8. Also, each of the plurality of relay nodes 121, 122, and 123 may set the timer to enable the harmonic mean to be in inverse proportion to the timer.

Also, each of the plurality of relay nodes 121, 122, and 123 may compare the equivalent channel gain with the channel gain of the channels between the signal receiving node 130 and the plurality of relay nodes 121, 122, and 123, detect a smaller channel gain, and set the timer to enable the smaller channel gain to be in inverse proportion to the timer.

When the setting of the timer is completed, a relay node where the timer first expires from among the plurality of relay nodes 121, 122, and 123 may broadcast the network-coded signal.

In this case, for example, when the network-coded signal is received from the relay node where the timer first expires, remaining relay nodes excluding the relay node where the timer first expires may not broadcast a signal network-coded by the remaining relay nodes.

When the network-coded signal is received from the relay node where the timer first expires, the signal receiving node 130 may perform decoding based on the signals received from the plurality of signal transmission nodes 111, 112, and 113, and the signal received from the relay node where the timer first expires, and thereby may detect the signals transmitted by the plurality of signal transmission nodes 111, 112, and 113.

In this case, for example, the signal receiving node 130 may detect the signals transmitted by the plurality of signal transmission nodes 111, 112, and 113, using Equation 13 and Equation 14.

Also, the signal receiving node 130 may detect the signals transmitted by the plurality of signal transmission nodes 111, 112, and 113 based on a channel state of channels between the plurality of signal transmission nodes 111, 112, and 113 and the relay node where the timer first expires.

For example, the signal receiving node 130 may detect the signals transmitted by the plurality of signal transmission nodes 111, 112, and 113, using Equation 15 through Equation 18.

Figure 3:
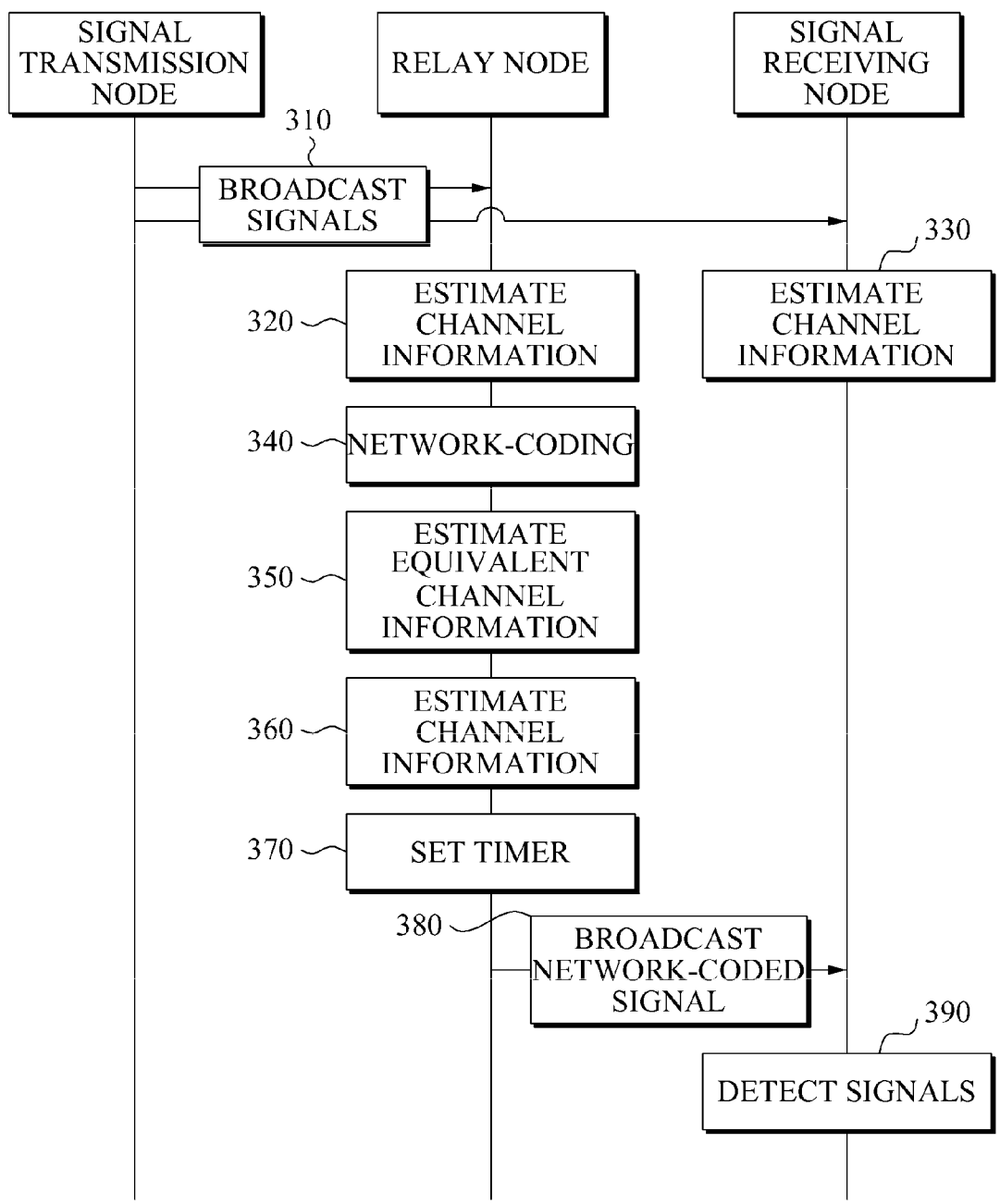
FIG. 3 is a flowchart illustrating a distributed exemplary embodiment.

FIG. 3 is a flowchart illustrating a distributed exemplary embodiment.

In operation 310, the plurality of signal transmission nodes 111, 112, and 113 may broadcast signals to the signal receiving node 130.

In operation 320, the plurality of relay nodes 121, 122, and 123 may estimate channel information of channels between the plurality of relay nodes 121, 122, and 123 and the plurality of relay nodes 121, 122, and 123 based on the signals received from the plurality of signal transmission nodes 111, 112, and 113.

In operation 330, the signal receiving node 130 may estimate channel information of channels between the plurality of signal transmission nodes 111, 112, and 113 and the signal receiving node 130, based on the signals received from the plurality of signal transmission nodes 111, 112, and 113.

In operation 340, the plurality of relay nodes 121, 122, and 123 may perform network-coding with respect to the signals received from the plurality of signal transmission nodes 111, 112, and 113.

In operation 350, each of the plurality of relay nodes 121, 122, and 123 may regard the channels between each of the plurality of relay nodes 121, 122, and 123 and the plurality of signal transmission nodes 111, 112, and 113 as a single channel based on the estimated channel information, and estimate equivalent channel information of the single channel.

In operation 360, the plurality of relay nodes 121, 122, and 123 may estimate channel information of channels between the plurality of relay nodes 121, 122, and 123 and the signal receiving node 130.

In operation 370, each of the plurality of relay nodes 121, 122, and 123 may set a timer based on the channel information estimated in operation 360 and the equivalent channel information estimated in operation 350.

In operation 380, a relay node where the timer first expires from among the plurality of relay nodes 121, 122, and 123 may broadcast the network-coded signal.

In operation 390, the signal receiving node 130 may perform decoding based on the signals, received from the plurality of signal transmission nodes 111, 112, and 113, and the signal received from the selected relay node where the timer first expires, and thereby may detect the signals transmitted by the plurality of signal transmission nodes 111, 112, and 113.

The centralized exemplary embodiment and the distributed exemplary embodiment may be used in a communication system using a fixed relay node as illustrated in FIG. 1 for example, as well as in an ad-hoc based communication system.

<Application in Ad-Hoc Based Communication System>

Figure 4:
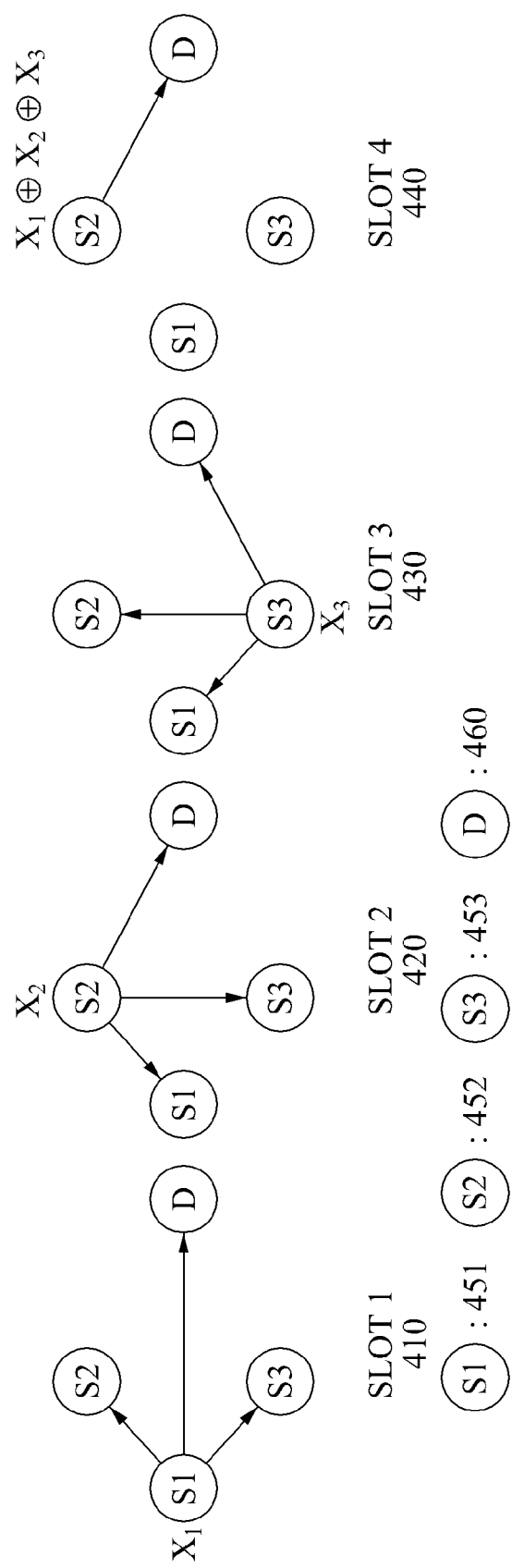
FIG. 4 is a conceptual diagram illustrating an exemplary ad-hoc communication system.

FIG. 4 is a conceptual diagram illustrating an exemplary ad-hoc communication system.

A signal transmission node (S1) 451 may transmit a signal $X_1$ to a signal receiving node (D) 460 in a time slot (1) 410.

It may be assumed that a signal transmission node (S2) 452 and a signal transmission node (S3) 453 may receive the signal $X_1$ transmitted by the signal transmission node (1) 451.

The signal transmission node (S2) 452 may transmit a signal $X_2$ to the signal receiving node (D) 460 in a time slot (2) 420.

It may be assumed that the signal transmission node (S1) 451 and the signal transmission node (S3) 453 receive the signal $X_2$ transmitted by the signal transmission node (S2) 452.

The signal transmission node (S3) 453 may transmit a signal $X_3$ to the signal receiving node (D) 460 in a time slot (S3) 430.

It may be assumed that the signal transmission node (S2) 452 and the signal transmission node (S1) 451 receive the signal $X_3$ transmitted by the signal transmission node (S3) 453.

In a time slot (4) 440, any one signal transmission node to function as a relay node from among the signal transmission node (S1) 451, the signal transmission node (S2) 452, and the signal transmission node (S3) 453 may perform network-coding with respect to signals, received from other signal transmission nodes, and a signal transmitted by the signal transmission node functioning as the relay node. Also, the signal transmission node, functioning as the relay node, may transmit the network-coded signal to the signal receiving node 460.

In this case, for example, the signal transmission node may decode the signals, received from the other signal transmission nodes, perform an XOR operation with respect to the decoded signals, and transmit the XORed signals to the signal receiving node (D) 460.

In this case, for example, the signal transmission node may be selected according to any one method described in the centralized exemplary embodiment and the distributed exemplary embodiment.

For example, when it is assumed that the signal transmission node (S2) 452 is selected from the signal transmission node (S1) 451, the signal transmission node (S2) 452, and the signal transmission node (S3) 453, the signal transmission node (S2) 452 may be selected by the signal receiving node (D) 460 in the centralized exemplary embodiment.

In the distributed exemplary embodiment, each of the signal transmission node (S1) 451, the signal transmission node (S2) 452, and the signal transmission node (S3) 453 may set a timer, and a signal transmission node where the timer first expires from among the signal transmission node (S1) 451, the signal transmission node (S2) 452, and the signal transmission node (S3) 453 may function as a relay node.

When the network-coded signal is received from the selected signal transmission node, the signal receiving node (D) 460 may perform decoding based on a signal received from the selected signal transmission node and signals received from the signal transmission node (S1) 451, the signal transmission node (S2) 452, and the signal transmission node (S3) 453. Also, the signal receiving node (D) 460 may detect the signals transmitted by the signal transmission node (S1) 451, the signal transmission node (S2) 452, and the signal transmission node (S3) 453.

Detailed descriptions of the centralized exemplary embodiment and the distributed exemplary embodiment have been provided with reference to FIG. 1 through FIG. 3. As such, further descriptions of how the centralized exemplary embodiment and distributed exemplary embodiment are used in the ad hoc based communication system are omitted for conciseness.

Figure 5:
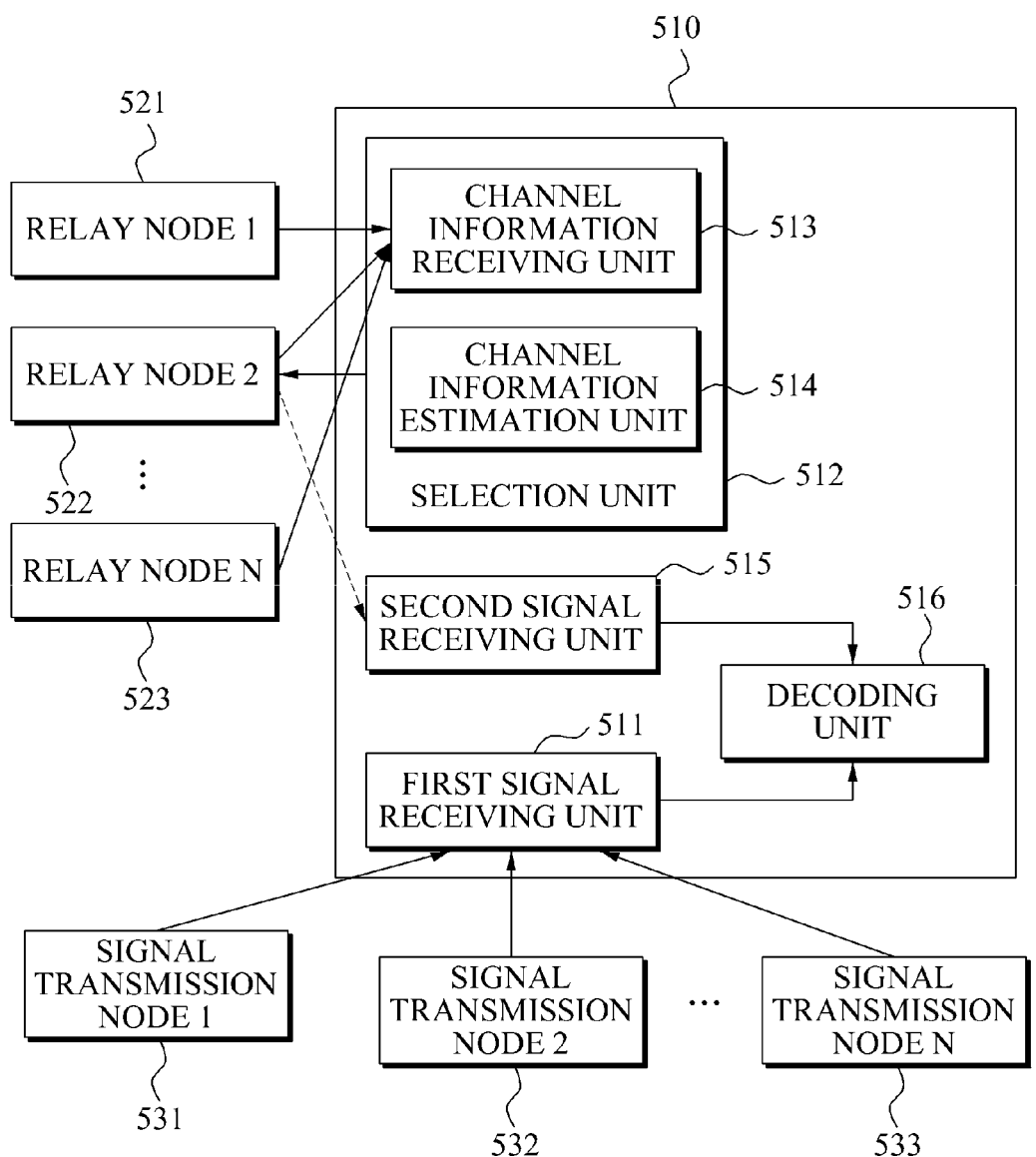
FIG. 5 is a diagram illustrating a configuration for an exemplary communication device.

FIG. 5 is a diagram illustrating a configuration for an exemplary communication device 510.

The configuration may include the communication device 510, a plurality of relay nodes 521, 522, and 523, and a plurality of signal transmission nodes 531, 532, and 533.

The communication device 510 may include a first signal receiving unit 511, a selection unit 512, a second signal receiving unit 515, and a decoding unit 516.

The first signal receiving unit 511 may receive signals from the plurality of signal transmission nodes 531, 532, and 533.

The selection unit 512 may select a relay node from the plurality of relay nodes 521, 522, and 523 based on channels between the plurality of signal transmission nodes 531, 532, and 533 and the plurality of relay nodes 521, 522, and 523, and channels between the plurality of relay nodes 521, 522, and 523 and the communication device 510.

The selection unit 512 may further include a channel information receiving unit 513 and a channel information estimation unit 514.

The channel information receiving unit 513 may receive equivalent channel information from each of the plurality of relay nodes 521, 522, and 523.

In this case, for example, the equivalent channel information may be estimated when each of the plurality of relay nodes 521, 522, and 523 regards the channels between the plurality of signal transmission nodes 531, 532, and 533 and each of the plurality of relay nodes 521, 522, and 523 as a single channel.

In this case, for example, each of the plurality of relay nodes 521, 522, and 523 may measure an equivalent SNR of the plurality of signal transmission nodes 531, 532, and 533 based on a BER, and estimate the equivalent channel information based on the equivalent SNR. The BER may be measured when an XOR operation is performed with respect to the signals received from the plurality of signal transmission nodes 531, 532, and 533.

The channel information estimation unit 514 may estimate channel information of the channels between the plurality of relay nodes 521, 522, and 523 and the communication device 510.

In this case, for example, the selection unit 512 may select the relay node from the plurality of relay nodes 521, 522, and 523 based on the equivalent channel information and the channel information estimated by the channel information estimation unit 514.

The second signal receiving unit 515 may receive a network-coded signal from the selected relay node.

When the relay node 522 is selected from the plurality of relay nodes 521, 522, and 523, the second signal receiving unit 515 may receive the network-coded signal from the relay node 522.

In this case, for example, the network-coded signal may be generated by the selected relay node performing network-coding with respect to the signals received from the plurality of signal transmission nodes 531, 532, and 533.

In this case, for example, the selected relay node may decode the signals received from the plurality of signal transmission nodes 531, 532, and 533, and perform the XOR operation with respect to the decoded signals to perform network-decoding.

Also, the selected relay node may calculate LLRs with respect to each of the signals, received from the plurality of signal transmission nodes 531, 532, and 533, perform an XOR operation with respect to the LLRs, and generate the network-coded signal based on the XORed LLR.

The decoding unit 516 may perform decoding based on the signals received by the first signal receiving unit 511 and the signal received by the second signal receiving unit 515, and may detect the signals transmitted by the plurality of signal transmission nodes 531, 532, and 533.

The decoding unit 516 may calculate an LLR of each of the signals received by the first signal receiving unit 511, and an LLR of the signal received by the second signal receiving unit 515. The decoding unit 516 may also detect the signals transmitted by the plurality of signal transmission nodes 531, 532, and 533 based on the calculated LLR of each of the signals received by the first signal receiving unit 511 and the calculated LLR of the signal received by the second signal receiving unit 515.

Also, the decoding unit 516 may adjust the signal received by the second signal receiving unit 515 based on the equivalent channel information, and detect the signals transmitted by the plurality of signal transmission nodes 531, 532, and 533.

Further descriptions on operations of the communication device 510, the plurality of relay nodes 521, 522, and 523, and the plurality of signal transmission nodes 531, 532, and 533 are omitted for conciseness, since the communication device 510, the plurality of relay nodes 521, 522, and 523, and the plurality of signal transmission nodes 531, 532, and 533 correspond to the signal receiving node 130, the plurality of relay nodes 121, 122, and 123, and the plurality of signal transmission nodes 111, 112, and 113, respectively.

Figure 6:
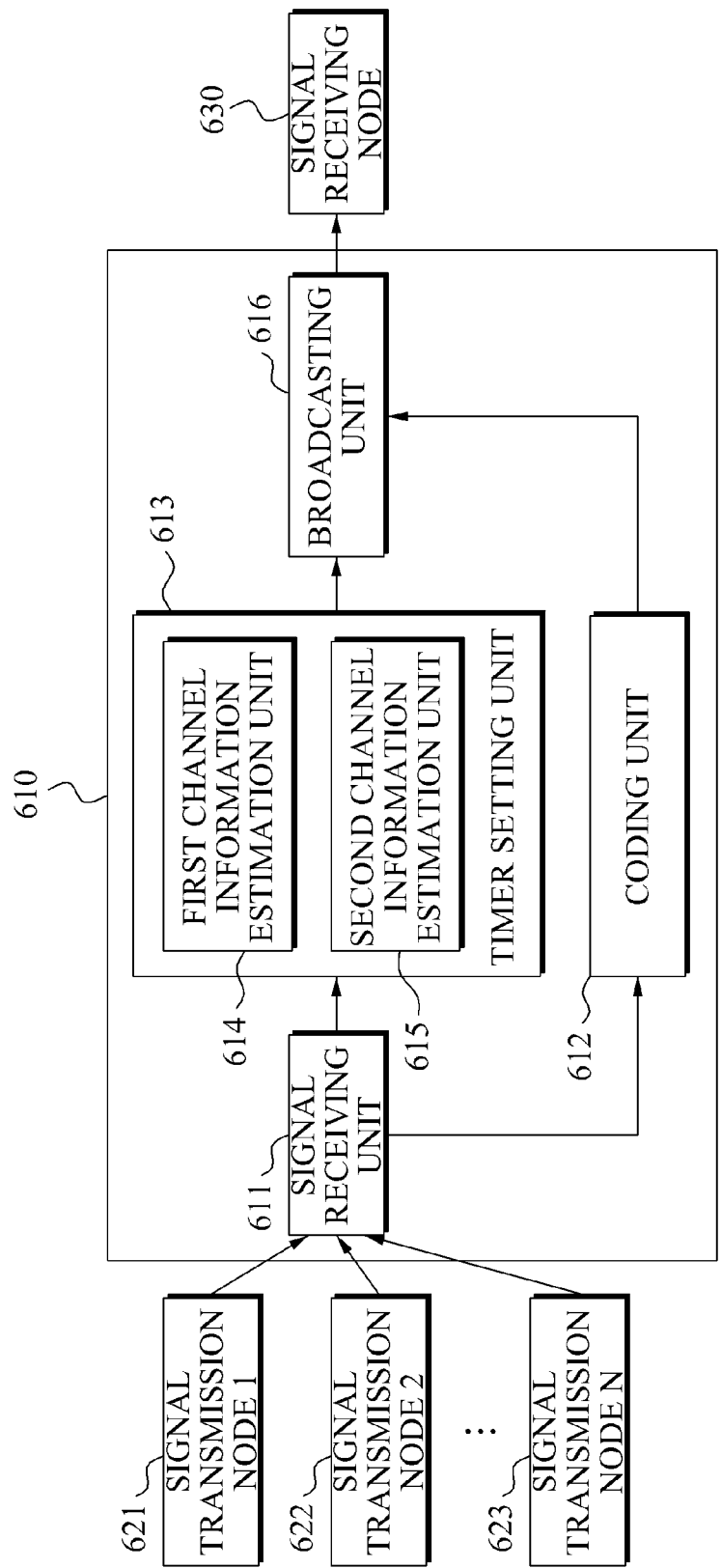
FIG. 6 is a diagram illustrating a configuration for an exemplary relay device.

FIG. 6 is a diagram illustrating a configuration for an exemplary relay device 610.

The configuration may include the relay device 610, a plurality of signal transmission nodes 621, 622, and 623, and a signal receiving node 630.

The relay device 610 may include a signal receiving unit 611, a coding unit 612, a timer setting unit 613, and a broadcasting unit 616.

The signal receiving unit 611 may receive signals from the plurality of signal transmission nodes 621, 622, and 623.

The coding unit 612 may perform network-coding with respect to the signals received by the signal receiving unit 611.

The coding unit 612 may decode the signals received by the signal receiving unit 611, and perform an XOR operation with respect to the decoded signals to perform network-decoding.

Also, the coding unit 612 may calculate LLRs with respect to each of the signals, received by the signal receiving unit 611, perform the XOR operation with respect to the LLRs, and generate the network-coded signal based on the XORed LLR.

The timer setting unit 613 may set a timer based on channels between the plurality of signal transmission nodes 621, 622, and 623 and the relay device 610, and a channel between the relay device 610 and the signal receiving node 630.

The timer setting unit 613 may include a first channel information estimation unit 614 and a second channel information estimation unit 615.

The first channel information estimation unit 614 may regard the channels between the plurality of signal transmission nodes 621, 622, and 623 and the relay device 610 as a single channel, and estimate equivalent channel information about the regarded single channel.

In this case, for example, the first channel information estimation unit 614 may measure an equivalent SNR of the plurality of signal transmission nodes 621, 622, and 623 based on a BER, and estimate the equivalent channel information based on the equivalent SNR. The BER may be measured when the XOR operation is performed with respect to the signals received by the signal receiving unit 611.

The second channel information estimation unit 615 may estimate channel information about the channel between the relay device 610 and the signal receiving node 630.

In this case, for example, the timer setting unit 613 may set the timer based on the equivalent channel information and the channel information about the channel between the relay device 610 and the signal receiving node 630.

The broadcasting unit 616 may broadcast the network-coded signal when the timer expires.

In this case, for example, the broadcasting unit 616 may not broadcast the network-coded signal when the network-coded signal is received from another relay device before the timer expires.

The signal receiving node 630 may receive the signals, transmitted by the plurality of signal transmission nodes 621, 622, and 623, receive the network-coded signal from the relay device 610, and perform decoding based on the signals received from the plurality of signal transmission nodes 621, 622, and 623, and the signal received from the relay device 610. Accordingly, the signal receiving node 630 may detect the signals transmitted by the plurality of signal transmission nodes 621, 622, and 623.

In this case, for example, the signal receiving node 630 may calculate an LLR of each of the signals received from the plurality of signal transmission nodes 621, 622, and 623, and an LLR of the signal received from the relay device 610, and thereby may detect the signals transmitted by the plurality of signal transmission nodes 621, 622, and 623 based on the calculated LLR of each of the signals received from the plurality of signal transmission nodes 621, 622, and 623, and the calculated LLR of the signal received from the relay device 610.

Also, the signal receiving node 630 may adjust the signal received from the relay device 610 based on the equivalent channel information and detect the signals transmitted by the plurality of signal transmission nodes 621, 622, and 623.

Further descriptions on operations of the relay device 610, the plurality of signal transmission nodes 621, 622, and 623, and the signal receiving node 630 are omitted for conciseness, since the relay device 610, the plurality of signal transmission nodes 621, 622, and 623, and the signal receiving node 630 correspond to the plurality of relay nodes 121, 122, 123, the plurality of signal transmission nodes 111, 112, and 113, and the signal receiving node 130, respectively.

According to the example(s) set forth above, a communication device may select a relay node from a plurality of relay nodes in a communication system, and the selected relay node may receive signals transmitted by a plurality of signal transmission nodes associated with a cooperative communication, may perform network coding with respect to the received signals, and may transmit the network-coded signal to a signal receiving node once. Thus, frequency efficiency of the cooperative communication system may be improved.

Also, according to example(s) above, the communication device and the relay node may be used in an ad-hoc communication system and a cellular-based communication system using a fixed relay node.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication device, comprising:
a first signal receiving unit configured to receive signals from a plurality of signal transmission nodes;
a selection unit configured to select one relay node from a plurality of relay nodes based on channels between the plurality of signal transmission nodes and the plurality of relay nodes and channels between the plurality of relay nodes and the communication device;
the selection unit comprises:
a channel information receiving unit configured to receive equivalent channel information from each of the plurality of relay nodes; and
a channel information estimation unit configured to estimate channel information of the channel between the plurality of relay nodes and the communication device,
wherein the equivalent channel information is estimated when each of the plurality of relay nodes regards the channels between each of the plurality of relay nodes and the plurality of signal transmission nodes as a single channel;
a second signal receiving unit configured to receive a network-coded signal from the selected relay node; and
a decoding unit configured to perform decoding based on the signals received by the first signal receiving unit and the signal received by the second signal receiving unit, and to detect the signals transmitted by the plurality of signal transmission nodes,
wherein the network-coded signal is generated by the selected relay node performing network-coding with respect to the signals received from the plurality of signal transmission nodes.

2. The communication device of claim 1, wherein the selection unit selects the one relay node from the plurality of relay nodes based on the equivalent channel information and the channel information estimated by the channel information estimation unit.

3. The communication device of claim 1, wherein each of the plurality of relay nodes measures an equivalent Signal to Noise Ratio (SNR) of the plurality of signal transmission nodes based on a Bit Error Rate (BER) and estimates the equivalent channel information based on the equivalent SNR, the BER measured when an exclusive OR (XOR) operation is performed with respect to the signals received from the plurality of signal transmission nodes.

4. The communication device of claim 1, wherein the selected relay node decodes the signals received from the plurality of signal transmission nodes and performs an XOR operation with respect to the decoded signals to perform network-decoding.

5. The communication device of claim 1, wherein the selected relay node calculates Log Likelihood Ratios (LLRs) with respect to each of the signals received from the plurality of signal transmission nodes, performs an XOR operation with respect to the LLRs, and generates the network-coded signal based on the XORed LLR.

6. The communication device of claim 5, wherein the decoding unit calculates an LLR of each of the signals received by the first signal receiving unit and an LLR of the signal received by the second signal receiving unit, and detects the signals transmitted by the plurality of signal transmission nodes based on the calculated LLR of each of the signals received by the first signal receiving unit and the calculated LLR of the signal received by the second signal receiving unit.

7. The communication device of claim 1, wherein the decoding unit adjusts the signal received by the second signal receiving unit based on the equivalent channel information and detects the signals transmitted by the plurality of signal transmission nodes.

* * * * *